United States Patent [19]

Omi

[11] Patent Number: 5,164,027

[45] Date of Patent: Nov. 17, 1992

[54] SNOW TIRE AND BRAKE PINS THEREFOR

[76] Inventor: Akiyoshi Omi, Heiwa 399-6, Nishi-Ku, Sapporo-shi, Hokkaido, Japan

[21] Appl. No.: 482,799

[22] Filed: Feb. 21, 1990

[30] Foreign Application Priority Data

Feb. 21, 1989 [JP] Japan .................................. 1-40587

[51] Int. Cl.⁵ ............................................. B60C 11/16
[52] U.S. Cl. .................................... 152/212; 152/210
[58] Field of Search ............... 152/167, 210, 211, 212

[56] References Cited

U.S. PATENT DOCUMENTS

| 992,239 | 5/1911 | Noel | 152/210 |
|---|---|---|---|
| 3,831,655 | 8/1974 | Cantz | 152/210 |
| 3,865,167 | 2/1975 | Gebert | 152/212 |
| 4,076,065 | 2/1978 | Somers | 152/210 |

FOREIGN PATENT DOCUMENTS

| 2224257 | 11/1973 | Fed. Rep. of Germany . |
| 2318801 | 10/1974 | Fed. Rep. of Germany . |
| 67305 | 5/1988 | Japan . |
| 319826 | 6/1957 | Switzerland . |
| 8229 | 4/1906 | United Kingdom . |
| 1407404 | 2/1972 | United Kingdom . |

Primary Examiner—Michael W. Ball
Assistant Examiner—Francis J. Lorin

[57] ABSTRACT

Disclosed are a brake pin for snow tire and a snow tire with such brake pins. The brake pin comprises (a) a metal flange formed with a plurality of holes in the peripheral portion thereof,
(b) a plurality of metal pins inserted in the respective holes of the metal flange,
(c) a metal cover covering the outer periphery of the metal flange, and
(d) a rubber spacer stuffing a space defined by the pins.

The snow tire is provided with a plurality of holes extending radially and arranged uniformly space apart along the road-engaging surface. The brake pins are fitted to the holes of the tire. Vehicle with the snow tire can run on ice or pressed snow-covered paved road without slipping and do not damage the pavement when it is driven on uncovered paved road such as asphalt-paved road.

7 Claims, 7 Drawing Sheets

(PRIOR ART)

Fig. 18

(PRIOR ART)

Fig. 19

(PRIOR ART)

SNOW TIRE AND BRAKE PINS THEREFOR

BACKGROUND OF THE INVENTION

1. Field of the Invention

The present invention relates to a snow tire and brake pins therefor for use on automobiles or vehicles which are used for land travel in cold areas.

2. Description of Related Arts

Heretofore, spike tires have been used widely as a special equipment tire for use during winter seasons for vehicles for transportation (i.e., automobiles) intended to be run in snowy or cold areas.

Figure 15:
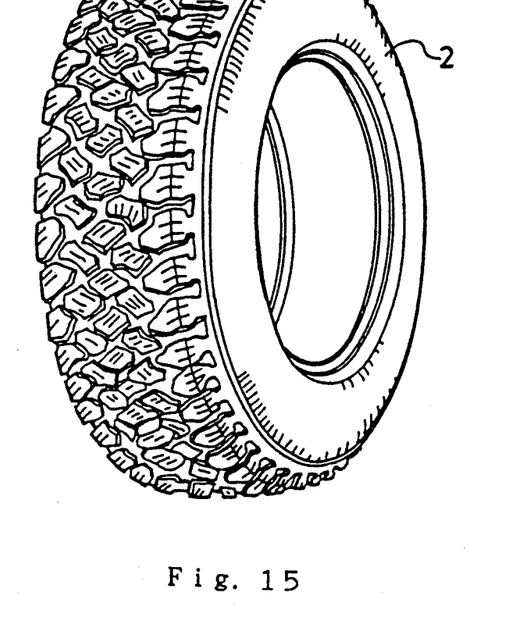
FIG. 15 is a perspective view of a spike tire before brake pins (spike pins) are fitted thereto.

FIG. 15 is a perspective view of a spike tire before brake pins (spike pins) are fitted thereto.

Figure 16:
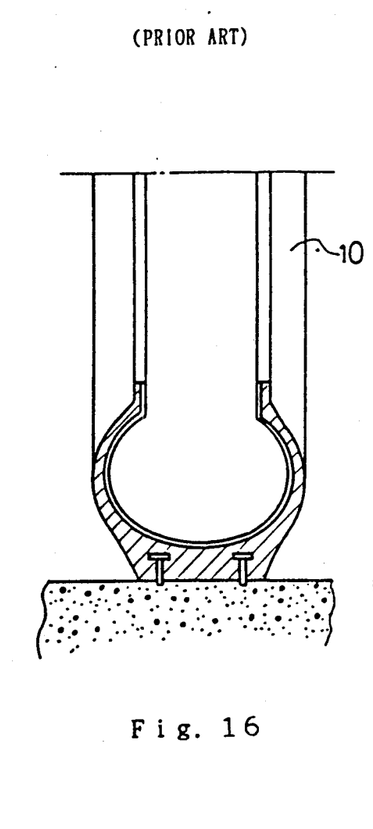
FIG. 16 is a transverse section of a conventional spike tire.
Figure 17:
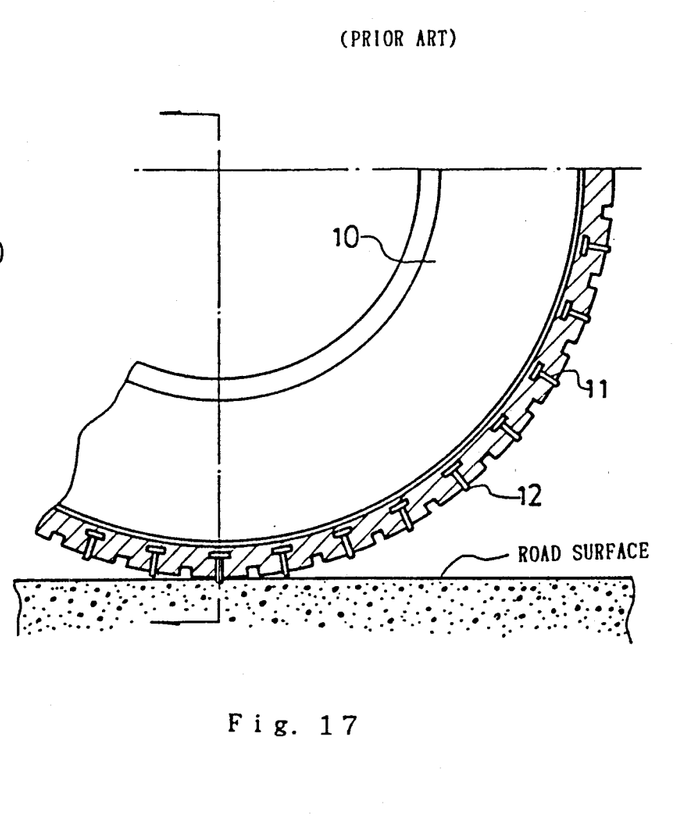
FIG. 17 is a longitudinal section of a conventional spike tire.
Figure 18:
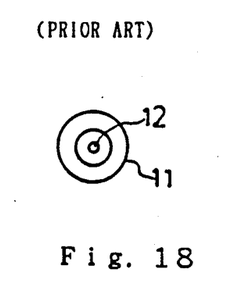
FIG. 18 is a plan view of an example of a spike pin used for a conventional spike tire.
Figure 19:
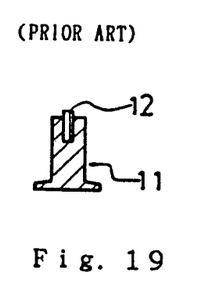
FIG. 19 is a sectional view of an example of a spike pin used for a conventional spike tire.
Figure 20:
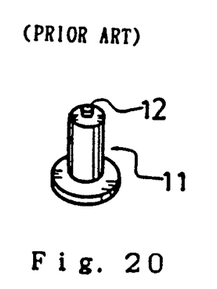
FIG. 20 is a perspective view of an example of a spike pin used for a conventional spike tire.

FIGS. 16 and 17 are a transverse section and a longitudinal section, respectively, of a conventional spike tire, and FIGS. 18 through 20 are a plan view, sectional side view, and perspective view, respectively, of an example of a spike pin used for the conventional spike tire.

As shown in FIGS. 16 and 17, existing spike tires 10 generally include basic rubber tires which have a plurality of metal spike pins 11 uniformly spaced apart and embedded radially in the road engaging surface of the tread such that the tips 12 of the respective spike pins 11 are protruding slightly out of the road-engaging surface of the tire. Usually, the tips 12 are provided with a protective member made of super hard alloy so as to prevent the wear of the pins. The spike tires of the above-described construction have been felt indispensable by most drivers for assuring traffic safety during winter seasons in cold areas because they can avoid slipping while the automobile is being driven, with the spike pins 11 thrusting into the pressed snow surface or icebound surface on the road.

Recently, however, there has arisen a serious problem for society in that a large amount of dust is formed due to the use of spike tires, and to the rapid increase in the amount of traffic in towns and cities. This is based on a phenomenon that when vehicles equipped with spike tires run on a paved road which is not covered with snow, the tips 12 of the spike pins cut or scrape the pavement material such as asphalt or concrete to form fine particles thereof or dust which then are scattered and float in the air. Dust is formed very often and in large amounts particularly at the change of season, for example, from autumn (fall) to winter or from winter to spring in towns and cities where there is much traffic, and the amount of dust formed increases greatly year after year. Thus, it is now feared that formation of dust by the use of spike tires has significant impact on the health of urban inhabitants.

In order to avoid pollution of the environment with dust, there would seem to be no choice but to completely prohibit people from using spike tires. In fact, the use of spike tires is prohibited completely by the authorities in some countries.

In Japan, efforts are being made by the authority to promote the use of tires of a new type which can create a braking effect by using rubber only. The new tires are called studless or non-spike tires. However, the new tires do not seem as excellent in the performance of braking or driving as had been expected or advertised by the manufacturers. And, there is strong desire among professional drivers such as drivers of hired cars, taxis, trucks and the like that the use of conventional spike tires which have excellent braking performance be allowed in future, even for a limited period of time such as for several years.

New tires such as studless tires and snow tires, which are being put into use presently, are designed to improve braking power by using a basic tire made of a soft rubber of a special composition and provided with grooves of a sophisticated shape or pattern on its road-engaging surface. These tires are said to exhibit braking power of only about 30% of that given by the conventional spike tires when the vehicle equipped with this type of tires is driven on a hard pressed snow surface such as one after melting and refreezing or an icebound road. This would strongly suggest that there would be a limitation in achieving sufficient braking performance by using only rubber.

After intensive investigation in respect to such new tires, the present inventor has reached a conclusion that in order to assure the same level of braking performance or driving performance as the conventional spike tires 10, it is necessary to use a member or part which can serve as something like claws in a limb or paw of animal. However, this claw-like part or member should not scrape the pavement. To explain the conventional spike tires 10 in detail, spike pins 11 are radially embedded or implanted in a rubber tire in a uniformly spaced apart fashion (FIGS. 16 and 17). Since the spike pins 11, which are made of a metal, one of non-elastic material, are present in rubber, one of an elastic material, and the tips of the spike pins are provided with a super hard alloy protector, the rubber is worn out and the spike pins 11 come out of the rubber, i.e., protrude from the surface of the tire after its repeated use or after driving of the vehicle for a long period of time. In this state, the spike pins 11 scrape a larger amount of pavement, resulting in the formation of more dust. This mechanism could be ascribable to the use of spike pins 11, i.e., metal pins. However, this assumption is not justified.

In the previous investigation, the present inventor has also found that the formation of dust is not caused by the mere fact that spike pins 11 are made of a metal or they are provided with a super hard alloy protector at their tips 12, but dust is formed because spike pins 11 are used alone. In other words, the cause of formation of dust is not what material is used but instead what structure the spike pin 11 has.

According to the previous proposal by the present inventor (Japanese Utility Model Publication (Kokai) No. 67305/1988), the spike pins which are designed to have a resilient structure are embedded radially in a studless tire so that they can absorb resilient deformation of the rubber tire. By this construction, the spike tire can prevent the occurrence of damages on the paved road and thus the formation of dust while maintaining its braking performance in the case of driving the vehicle equipped with the tire on icebound or snow-covered paved-road is as high as the breaking performance of conventional spike tires. More particularly, the tire includes brake pins which each have a hard flange in the form of a circular plate to which are fixed as a bundle plural (e.g., 5 to 10) pins of U-shaped steel wire rod covered with a wrapping rubber such that the forks of the U-shaped pins pierce into the wrapping rubber until the flange comes in contact with the wrapping rubber. Studless tires of a structure in which the above-described brake pins are embedded radially in the rubber tire so that the tips of the pins are on the same level as the road-engaging surface of the tire can effectively prevent slipping due to the effects of flexible rubber of the studless tire and unique construction which sharp tips of the brake pins made of wire rod have, thus exhibiting sufficient braking power when the vehicle equipped with the studless tire of this type is run on a slippery hard snow-covered or icebound road. On the other hand, when the tire is in contact with pavement such as asphalt or the like, the brake pins made of wire rods serve as soft resilient member for the pavement and will not damage the surface of the road since they themselves are bent.

However, the above-described brake pins are disadvantageous in that wire rods are implanted in hard flanges made of hard synthetic resin or antimony alloy using a metallic mold and therefore junction portions between the wire rod and the flange are weak and tend to cause cracks. As the result, the pins could be dropped out after continued use, which would deteriorate the impact strength of the tire.

SUMMARY OF THE INVENTION

It is an object of the present invention to provide a snow tire which can obviate the above-described disadvantage of the prior art and which has an excellent braking performance when the vehicle equipped therewith is run on an icebound or snow-covered road without scraping the pavement of the road and which has a long service life as well as brake pins for use in such snow tire.

As the result of intensive investigation, it has now been found that the object of the invention can be achieved by providing a snow tire with a solid metal flange, instead of a hard flange made of a plastics or alloy, which metal flange is formed with a plurality of holes on the peripheral portion thereof and inserting pins in the respective holes, covering the outer periphery of the flange with a metal cover, and stuffing the space defined by the pins with a rubber spacer.

Accordingly, in one aspect, the present invention provides a brake pin for snow tire, comprising:
(a) a metal flange formed with a plurality of holes in the peripheral portion thereof,
(b) a plurality of metal pins inserted in the respective holes of the metal flange,
(c) a metal cover covering the outer periphery of the metal flange, and
(d) a rubber spacer stuffing a space defined by the pins.

In another aspect, the present invention provides a snow tire comprising:
(1) a base rubber tire having a road-engaging surface formed with a plurality of holes extending radially and arranged uniformly space apart along the road-engaging surface, and
(2) a plurality of brake pins inserted in the holes formed in the base rubber tire, each brake pin comprising
(a) a metal flange formed with a plurality of holes in peripheral portion thereof,
(b) a plurality of metal pins inserted in the respective holes of the metal flange,
(c) a metal cover covering the outer periphery of the metal flange, and
(d) a rubber spacer stuffing a space defined by the pins.

DESCRIPTION OF PREFERRED EMBODIMENTS

Hereinafter, the present invention will be described in greater detail with reference to preferred embodiments illustrated in the attached drawings.

FIGS. 4 through 12 illustrate components of an example of the brake pin according to the present invention. As shown in the figures in disassembled manner, a brake pin 1 of the present invention includes a plurality of pins 3 made of a metal wire rod which are cut so as to have a predetermined length, a flat, circular metal flange 5 having a peripheral portion thereof with a plurality of holes 6 in which the pins 3 are fitted, a metal cover 7 which is in tight contact with the flange 5 and which wraps or covers it, and a generally cylindrical rubber spacer 8 which fills a space defined by the pins 3 and which is formed with grooves 9 for receiving the pins 3 therein.

Figure 4:
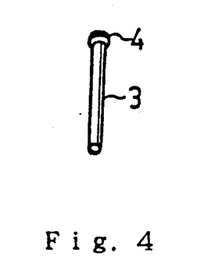
FIG. 4 is a perspective view of a pin of the brake pin according to the present invention.

The pins 3 are formed by cutting steel wire rod, for example, piano wire, in a predetermined length. One end of the resulting pin is formed as by molding or forging to have a flat circular head 4 as shown in FIG.

4. The other end of the wire rod is left, having a cut surface at right angles formed by shearing.

Figure 6:
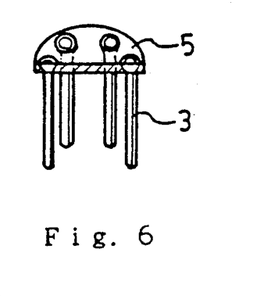
FIG. 6 is an overhead perspective view of a flange with pins of the brake pin according to the present invention.
Figure 7:
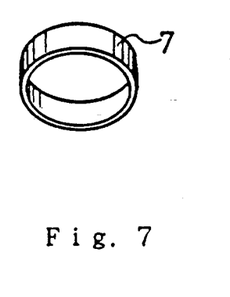
FIG. 7 is a perspective view of a cover of the brake pin according to the present invention.
Figure 8:
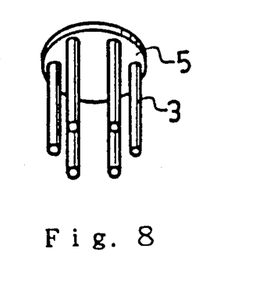
FIG. 8 is an underside perspective view of a flange with pins of the brake pin according to the present invention.
Figure 11:
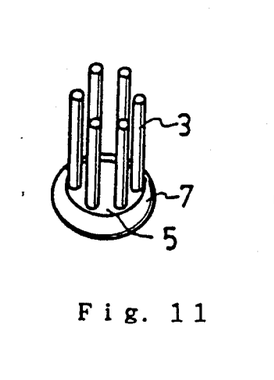
FIG. 11 is a perspective view of a cover enwrapping a flange with pins of the brake pin according to the present invention.

The metal flange 5 is produced by providing a generally circular steel plate with a plurality of holes 6 in which the pins 3 are inserted or fitted such that the heads 4 of the pins 3 are all on the same side of the flange (FIG. 6). The diameter of the hole is substantially the same as the diameter of the pin 3 so that the pin can be snugly fitted in the hole 6. The metal cover 7 is a capped ring made of a steel as shown in FIG. 7 and having an inner diameter substantially the same as or slightly larger than the outer diameter of metal flange so that the metal cover can tightly hold the metal flange 5 as shown in FIG. 8. The one end of the capped ring or metal cover 7 on the same side as the cut surfaces of the pins 3 is processed so as to enwrap the flange 5 as shown in FIG. 11.

The rubber spacer 8 is a wear resistant cylindrical rubber which is formed on its outer peripheral surface with a plurality of grooves 9 adapted to receive the wire rods or pins 3 fitted to the flange 5.

The brake pin 1 of the present invention can be assembled from the pins 3, the metal flange 5, the metal cover 7 and the rubber spacer 8 as described below.

Figure 9:
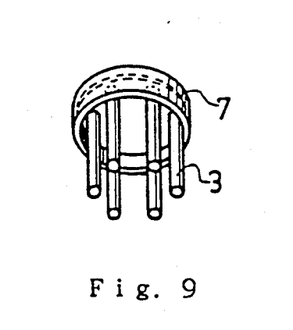
FIG. 9 is a perspective view of a cover surrounding a flange with pins of the brake pin according to the present invention.
Figure 10:
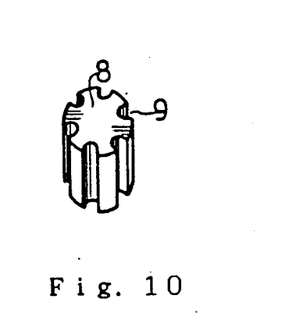
FIG. 10 is a perspective view of a spacer of the brake pin according to the present invention.
Figure 12:
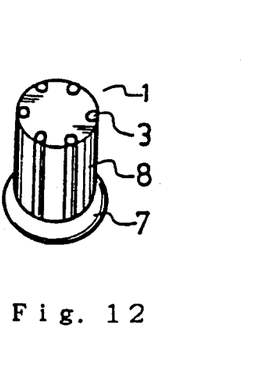
FIG. 12 is a perspective view of a brake pin according to the present invention.

That is, the pins 3 are inserted through the holes 6 of the metal flange 5 so that the heads 4 of the pins 3 are present on the same side of the metal flange and the heads 4 are pressed to be of the same level as the surface of the metal flange 5 as shown in FIG. 6 and FIG. 8. The resulting metal flange with the pins is inserted in the metal cover 7 as shown in FIG. 9. One end of the metal cover 7 is formed or pressed by using a reducing or sinking jig so that the metal cover 7 can hold the metal flange 5 tightly as shown in FIG. 11. To this structure is fitted the rubber spacer 8 (FIG. 10) in such a manner that the pins 3 are engaged with the corresponding grooves to form a solid brake pin as shown in FIG. 12.

The shapes of the metal flange 5 and metal cover 7 are not limited to the circle illustrated but polygons including trigon, tetragon and the like or any other desired shapes can be used. The dimension of the metal flange 5 may be of the same level as the similar part used in the conventional spike pin. Generally, the metal flange 5 may be of about 4 to about 8 mm in diameter and of about 0.8 to about 2.0 mm in thickness, and the wire rod to be fitted to the flange may have a diameter of about 1.0 to about 2.0 mm and a length of about 10 to about 20 mm.

Figure 5:
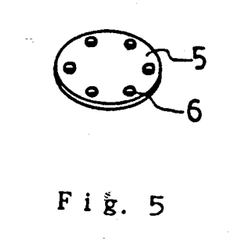
FIG. 5 is a perspective view of a flange of the brake pin according to the present invention.

The positions of the wire rods or pins to be fitted to the metal flange 5 (i.e., the positions of the holes 6) are not limited particularly and any desired positions may be selected. However, in order to make effective use of the elasticity of the rubber spacer 8, it is preferred that the holes are made in the peripheral region of the flange as remote as possible from the center of the flange as shown in FIG. 5 and the rubber spacer 8 is present in the inside of the flange as extensively as possible.

As for material of the rubber spacer, there can be used, for example, soft, wear resistant rubber as used in the conventional studless tires.

The snow tire with the brake pins according to the present invention will be described below.

Figure 1:
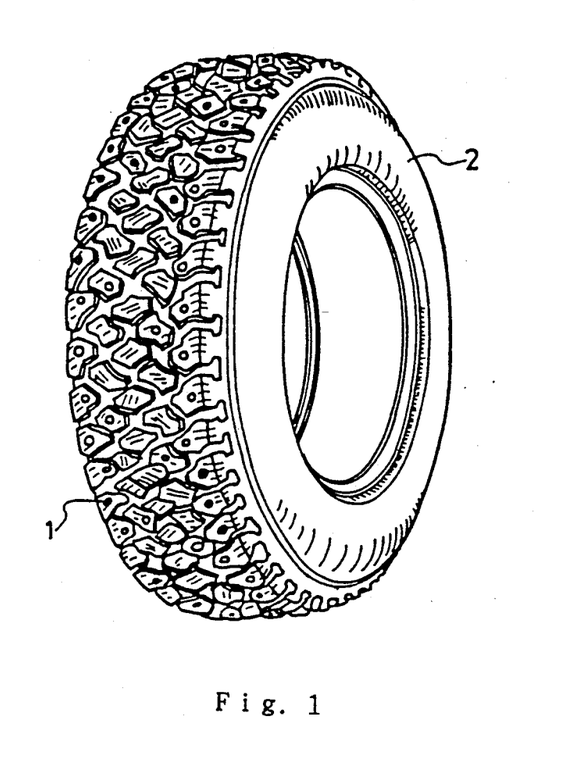
FIG. 1 is a perspective side view of a snow tire with brake pins according to the present invention.

FIG. 1 is a perspective view of the snow tire 2 fitted with the brake pin 1 described above.

The brake pins 1 are fitted in holes 2a which are formed extending radially and arranged uniformly spaced apart along the road-engaging surface of the base tire 2 near each extreme side end of the road-engaging surface and at a predetermined distance spaced apart therefrom, or slightly shifted toward the center of the width of the road-engaging surface of the tire. The holes 2a are positioned in protruded portions of the road-engaging surface of the base rubber tire.

Figure 2:
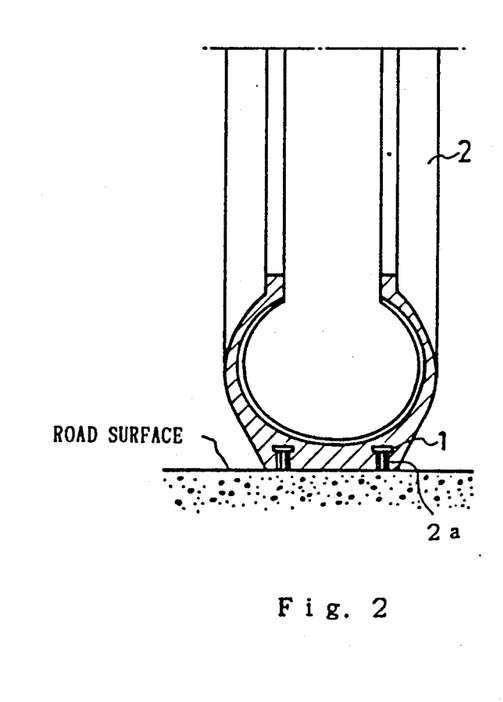
FIG. 2 is a transverse section of a snow tire with brake pins according to the present invention.
Figure 3:
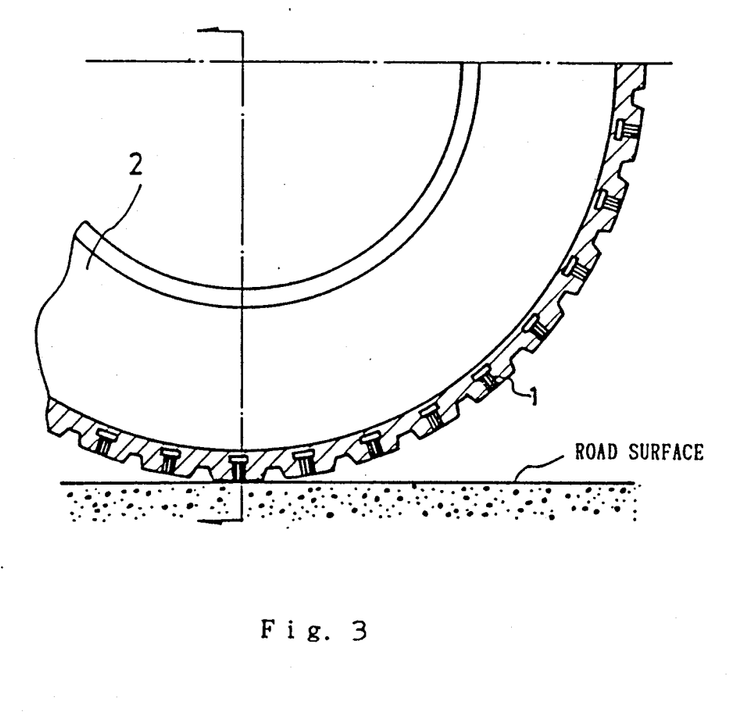
FIG. 3 is a longitudinal section of a snow tire with brake pins according to the present invention.
Figure 14:
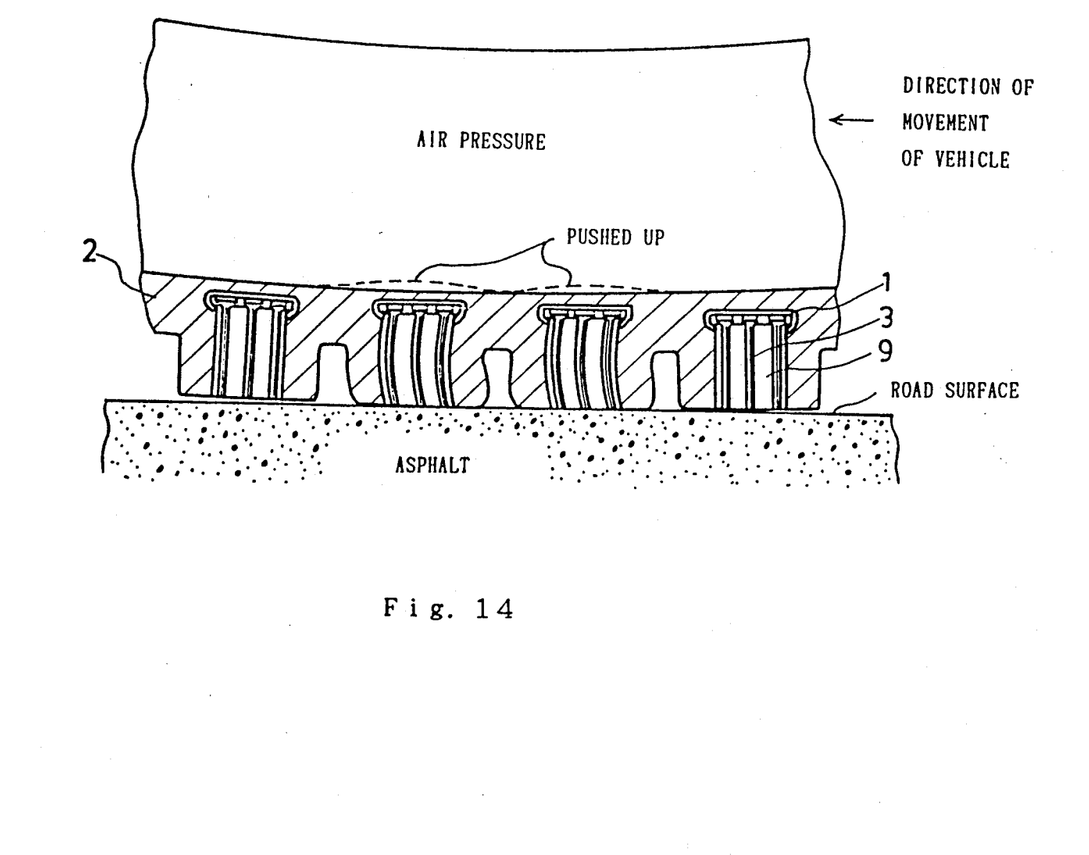
FIG. 14 is a longitudinal section explaining the action of a snow tire with brake pins according to the present invention on a paved road without snow or ice.

The brake pins 1 can be fitted to the basic tire in a similar manner to that used for the conventional spike tires. The difference is only that in the case of the conventional spike tire 10, the tips 12 of the spike pins 11 protrude by about 2 mm from the surface (road-engaging surface) of the tire in contrast to the present invention in which the tips of the brake pins 1 are on the same level as the road-engaging surface of the tire (FIGS. 2, 3 and 14). This construction is meant to avoid or minimize, if any, damages of the road which would otherwise occur while the vehicle with a snow tire having the brake pins 1 of the invention is being run where the pavement such as asphalt is exposed, i.e, without ice or snow.

Figure 13:
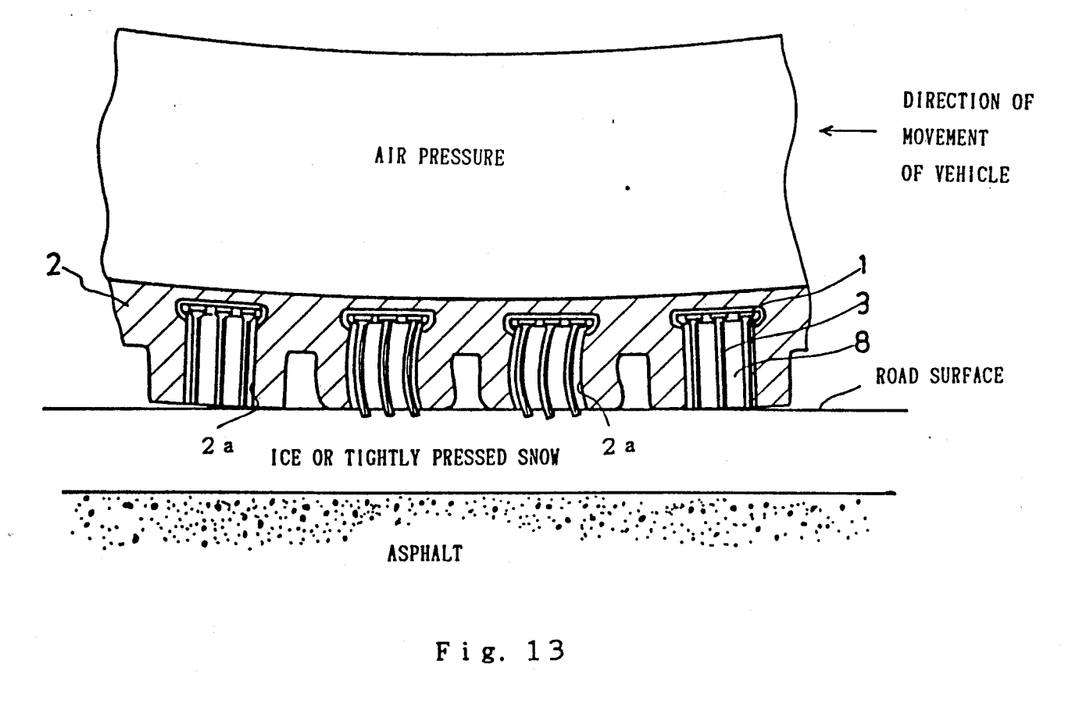
FIG. 13 is a longitudinal section explaining the action of a snow tire with brake pins according to the present invention on icebound or snow-covered road.

FIGS. 13 and 14 are longitudinal section of the snow tire 2 with the brake pins 1 according to the present invention, illustrating the conditions of the tire on the road while the vehicle with the tire 2 is being run thereon.

The features of the snow tire of the present invention are characterized by the following action.

FIG. 13 illustrates the state of snow tire in contact with the surface of road which is covered with ice or tightly pressed snow and therefore which is very slippery. As shown in FIG. 13, a plurality of sharp tips of the pins or wire rods 3 in the brake pins 1 stick into the ice or pressed snow since the spacer rubber 8 shrinks upon contact pressure and the tips of the wire rods come out and are exposed, and since the wire rods have a rigidity strong enough to stick into the ice or pressed snow on the road. Therefore, the brake pins 1 can effectively prevent slipping and exhibit braking power or driving power due to a unique action by the combination of the pins 3 and rubber spacer 8.

FIG. 14 illustrates the state of snow tire in contact with the non-covered with ice or snow asphalt-paved road. As shown in FIG. 14, the brake pin 1 as a whole serves as a soft spring and the tips of the pins 3 do not stick into the asphalt but are themselves bent to some extent due to resilience, with the result that the upward force exerted by the surface of the road is absorbed by the basic rubber tire. More particularly, a portion of the basic tire just above the metal flange 5 of the brake pin 1 is lifted slightly so that the metal flange 5 can move upwards if the pins 3 receive force from the surface of the paved road too excessive for the brake pins 3 to absorb it by the mechanism of flexural deformation of themselves.

The snow tire fitted with the brake pins of the present invention overcomes the disadvantage of the conventional tire made of rubber only and can grip the road with certainty and reliability. This is because the brake pin 1 of the invention as shown in FIGS. 4 to 12 has a sophisticated structure such that it is an assembly which comprises a plurality of thin wire rods uniformly arranged at a predetermined distance one from another combined with the rubber spacer 8 filling the space defined by the pins (FIG. 12) in contrast to the conventional spike pin 11 as shown in FIGS. 18 to 20 which has a rather simple structure. Further, it is to be noted that FIG. 12 shows the tips of the brake pins 1 to be co-planar with the outer end of the spacer 8, while FIGS. 2, 3, 13 and 14 show the tips of the brake pins 1 and the outer end of the spacer 8 to be co-planar with the road-engaging surface on the tire in non-road contact circumstances. This structure of the brake pin 1 of the present invention ensures that it exhibits braking effect or driving effect in accordance with the stiffness or hardness of the surface of the road. That is, when the vehicle is driven on hard ice or snow-covered road, the penetrating action of the brake pin 1 is observed since the brake pin is harder or tougher than the ice or snow. When it is intended to change the course or direction of the vehicle, for example, when leaving the wheel track on which it has run, it is easier and stabler to drive the vehicle with the snow tire of the present invention than with the conventional spike tire.

Furthermore, the use of the brake pin of the present invention, in which the wire rods are firmly fitted to the metal flange at one end thereof, the metal flange is reinforced with the metal cover, and the wire rods are flexibly settled with the rubber spacer, prevents the occurrence of cracks in the flange and thus omission of the pins, thereby assuring extended service life of the tire. This is unlike the conventional brake pin in which the pins are attached to U-shape hard plastics or antimony flange.

Tests conducted in the city of Sapporo, Japan, in winter by driving a vehicle with the snow tires with brake pins of the present invention and one with the conventional spike tires under the same conditions confirmed that the snow tire of the invention has excellent braking or driving power on ice or snow-covered road as compared with the conventional spike tire without causing any substantial damage to the pavement of the road. More particularly, when braking tests were performed on uncovered asphalt-paved road, the vehicle with the snow tire of the present invention did not at all damage asphalt-paved road despite the use of thin metal wire rods in contrast to the vehicle with the conventional spike tire which did give rise to considerable damage to the surface of the pavement.

It was also confirmed that the vehicle with the snow tire of the present invention was as comfortable to the driver as one with the conventional spike tire when it was run on uncovered asphalt-paved road.

Drivers can drive automobiles with a feeling of stability and safety by using the brake pin and snow tire with a brake pin according to the present invention. Therefore, the snow tire of the invention can fully replace the conventional spike tires if the use of the latter is prohibited completely. The snow tire of the invention can effectively avoid or minimize, if any, the occurrence of dust, which contributes to the protection of environment and health of inhabitants of towns and cities in areas where they have heavy snow or it is very cold in the winter.

While the invention has been described with reference to a preferred embodiment, it is obvious to one skilled in the art that various modifications may be made thereto without departing the spirit of the present invention.

What is claimed is:

1. A brake pin for a snow tire, comprising
   (a) a metal flange, said flange having a first surface, a second surface, an outer peripheral edge and a peripheral portion inwardly adjacent to said edge with a plurality of holes being formed in said peripheral portion between said first surface and said second surface,
   (b) a plurality of metal pins, each of said pins being of a predetermined length and having a first end and a second end, each of said pins being insertable in one of the holes of said flange such that said first end communicates with said flange at said first surface and said pin extends away from said second surface of said flange,
   (c) a metal cover, said cover covering said edge and said first surface of said flange, and
   (d) a spacer, said spacer filling a space defined between said pins, said spacer having an inward end and an outward end, said outward end and said second ends being co-planar.

2. The brake pin as claimed in claim 1, wherein said pins are steel wire rods, each said first end having an enlarged head portion and wherein each said head portion of each said pin is pressed into one of the holes of said flange.

3. The brake pin as claimed in claim 1, wherein said flange and said cover are made of steel.

4. The brake pin as claimed in claim 1, wherein said flange has a circular form.

5. The brake pin as claimed in claim 1, wherein said spacer is made of a soft, wear resistant rubber.

6. A snow tire comprising:
   (1) a base rubber tire having a road-engaging surface formed with a plurality of blind holes extending radially, said blind holes being uniformly spaced apart along said road-engaging surface, and
   (2) a plurality of brake pins, each of said plurality of brake pins being inserted in one of said plurality of blind holes each brake pin including:
      (a) a metal flange, said flange having a first surface, a second surface, an outer peripheral edge and a peripheral portion inwardly adjacent to said outer peripheral edge with a plurality of through holes formed in said peripheral portion,
      (b) a plurality of metal pins, one of said plurality of metal pins being inserted in each of said plurality of through holes, each of said plurality of pins having a near end and an away end, each said near end being at said first surface upon insertion in said flange,
      (c) a metal cover, said cover covering said outer peripheral edge and said first surface of said flange, and
      (d) a rubber spacer filling a space defined between said plurality of metal pins,
   wherein each away end of each of said plurality of metal pins is disposed in the plane of said road-engaging surface of the tire.

7. The snow tire as claimed in claim 6, wherein said road-engaging surface includes protruded tread portions, and wherein said plurality of blind holes are disposed near each extreme side end of said road-engaging surface and spaced at a predetermined distance apart therefrom, and wherein said plurality of blind holes are positioned in said tread portions.

* * * * *